United States Patent [19]

Giroud-Abel

[11] Patent Number: 4,559,372
[45] Date of Patent: Dec. 17, 1985

[54] FIREPROOFED POLYAMIDE COMPOSITIONS

[75] Inventor: Bruno Giroud-Abel, Ecully, France

[73] Assignee: Rhone-Poulenc Specialities Chimiques, Courbevoie, France

[21] Appl. No.: 663,483

[22] Filed: Oct. 22, 1984

[30] Foreign Application Priority Data

Oct. 21, 1983 [FR] France ................................ 83 17022

[51] Int. Cl.$^4$ .......................... C08K 3/02; C08K 3/16; C08K 3/22; C08K 3/24; C08K 3/26; C08K 3/32; C08K 3/34; C08K 5/09; C08K 5/15; C08K 5/34; C08K 5/36; C08K 5/45; C08K 9/10
[52] U.S. Cl. ..................................... 523/205; 524/79; 524/80; 524/99; 524/106; 524/111; 524/357; 524/392; 524/402
[58] Field of Search ................ 423/274, 322; 523/205, 523/210; 524/80, 403, 402, 79, 99, 84, 106, 327, 394, 111, 392, 357

[56] References Cited

U.S. PATENT DOCUMENTS

| | | | |
|---|---|---|---|
| 3,108,091 | 10/1963 | Illing et al. ........................... | 524/403 |
| 3,468,843 | 9/1969 | Busse .................................... | 524/403 |
| 3,883,475 | 5/1975 | Racky et al. ......................... | 524/414 |
| 4,157,975 | 6/1979 | Barge et al. .......................... | 524/357 |
| 4,208,317 | 6/1980 | Cerny et al. ......................... | 523/205 |
| 4,255,319 | 3/1981 | Peters ................................... | 524/80 |
| 4,399,064 | 8/1983 | Penneck .............................. | 524/403 |
| 4,489,183 | 12/1984 | Twardowska ....................... | 524/80 |

Primary Examiner—Veronica P. Hoke
Attorney, Agent, or Firm—Burns, Doane, Swecker & Mathis

[57] ABSTRACT

The polyamides are fireproofed and, e.g., phosphine-inhibited, by formulating red phosphorus and at least one lanthanide or yttrium compound therewith.

17 Claims, No Drawings

1

FIREPROOFED POLYAMIDE COMPOSITIONS

BACKGROUND OF THE INVENTION

1. Field of the Invention

The present invention relates to novel polyamide-based compositions which have been rendered fireproof by incorporation of red phosphorus therein, and to the use of such compositions in the fabrication of shaped articles well suited for electrical and electronic applications.

2. Description of the Prior Art

It is known to this art that the addition of red phosphorus to compositions based on polyamides imparts a high degree of fire resistance to same. However, the use of red phosphorus has a serious disadvantage in that it gives rise to the evolution of highly toxic hydrogen phosphide, which is formed under the action of the trace amounts of water present in the polymer and of the high temperature necessary for its conversion. It is also known that this disadvantage can be essentially overcome by the incorporation into the fireproof compositions of certain substances, such as metal compounds, which serve to fix the hydrogen phosphide. U.S. Pat. No. 3,883,475 features the use of cupric oxide for such purpose. French Pat. No. 2,367,100 describes an improvement wherein cadmium oxide is used in place of the CuO; in addition to its efficacy (at least equal to that of CuO) in inhibiting the evolution of phosphine, cadmium oxide also enables production of shaped articles having an especially high arc tracking resistance (in terms of French Standard Specification No. C 26220), which is equal to or greater than 400 volts in the case of compositions devoid of filler material and 375 volts in the case of compositions containing more than 25% by weight of fibrous glass filler.

The aforesaid '100 French patent also describes an additional improvement in the results obtained using cadmium oxide, and which features coating the red phosphorus with a polymeric material.

However, the cadmium oxide used in the fireproofed compositions of the prior art presents a practical problem associated with the known toxicity of this oxide, which no doubt strongly militates against the widespread use thereof.

SUMMARY OF THE INVENTION

Accordingly, a major object of the present invention is the provision of novel polyamide-based compositions which are both fireproof and devoid of cadmium oxide, but which nonetheless are at least equally as effective as the prior art compositions in terms of inhibiting the evolution of phosphine and in the arc tracking resistance thereof.

Another object of the present invention is the provision of novel adjuvants for polyamide-based compositions which can be used without adversely affecting the mechanical properties thereof, in particular without adversely affecting the resilience of fireproofed final articles shaped therefrom.

Yet another object of this invention is the provision of novel such adjuvants which make it possible to control and limit the change in the molecular characteristics of the fireproof polyamide during extrusion and injection molding. In general, when they are converted, the polyamides always undergo a change in their molecular characteristics. The extent of this change especially depends on the balance of the end groups of the polyamide, the residual moisture content thereof, the temperature of the molten mass during conversion, the conversion time and the nature and proportion of the additives present, and the change itself effects a modification in the rheological characteristics of the polymer, which can be undesirable for carrying out an acceptable molding operation and for producing articles of proper appearance and optimum quality. In the presence of red phosphorus, this change in the molecular characteristics of the polyamides is particularly pronounced and a substantial increase is observed in the viscosity index and the apparent viscosity of the molten phase, the consequences of which are a more difficult and nonuniform extrusion run, harsher injection molding conditions and the production of molded articles having a less attractive surface appearance. While cadmium oxide has proved to be a material which is capable of acting rapidly (the duration of an extrusion or injection molding operation) to control and limit this change, provided hereby are replacement compounds which are at least as active as cadmium oxide in this particular field vis-a-vis the rheological characteristics of polyamides rendered fireproof by means of red phosphorus.

Briefly, the present invention features at least one lanthanide-based compound as a replacement for cadmium oxide in fireproof polyamide-based compositions.

DETAILED DESCRIPTION OF THE INVENTION

More particularly according to the present invention, polyamide-based compositions are fireproofed with red phosphorus, and additionally comprise an effective amount of at least one lanthanide-based compound.

As utilized herein, by the term "lanthanide" there are intended those metals of the Periodic Table of the classification of elements which have atomic numbers ranging from 57 to 71, and also yttrium, which possesses similar properties although it has an atomic number of 39.

By the expression "lanthanide-based compound", there are intended:

(i) an organic or inorganic derivative of any one of the following lanthanides: cerium, lanthanum, praseodymium, neodymium, promethium, samarium, europium, gadolinium, terbium, dysprosium, holmium, erbium, ytterbium, thulium, lutetium and yttrium; the expression "at least one lanthanide-based compound" in this case connotes that, as well as a single derivative, it is possible to use a mixture of organic derivatives, a mixture of inorganic derivatives or a mixture of organic and inorganic derivatives of any one of the above-mentioned lanthanides; or (ii) a mixture of organic and/or inorganic derivatives of several of the aforesaid lanthanides; the expression "at least one lanthanide-based compound" means that, as well as a single mixture, it is possible to use a combination of several mixtures of this type.

In general, because of the relative quantities of the compounds of the various lanthanides in the most common ores, especially in monazite and bastnaesite, when a derivative of a single lanthanide is used, this lanthanide is preferably cerium, lanthanum, praseodymium or neodymium. Of these metals, cerium and lanthanum are the most abundant and are very particularly suitable.

Mixtures of derivatives of a plurality of lanthanides can also be used. In fact, it may be advantageous to avoid carrying out the lengthy and expensive separation of all of the lanthanides present in relatively small quantities in the commonly processed ores. In such a case, the following mixtures are generally used:

(1) a mixture of derivatives of cerium and one or more of the other lanthanides;

(2) a mixture of derivatives of lanthanum and one or more other lanthanides selected from among praseodymium, neodymium, promethium, samarium, europium, gadolinium, terbium, dysprosium, holmium, erbium, ytterbium, thulium, lutetium and yttrium;

(3) a mixture of derivatives of praseodymium and one or more other lanthanides selected from among neodymium, promethium, samarium, europium, gadolinium, terbium, dysprosium, holmium, erbium, ytterbium, thulium, lutetium and yttrium; and (4) a mixture of derivatives of neodymium and one or more other lanthanides selected from among promethium, samarium, europium, gadolinium, terbium, dysprosium, holmium, erbium, ytterbium, thulium, lutetium and yttrium.

When such mixtures of derivatives of a plurality of lanthanides are used in the compositions according to the invention, the cerium and/or lanthanum and/or praseodymium and/or neodymium advantageously constitute at least 40 mol % of the total amount of the lanthanides.

By the expression "organic lanthanide derivative" is more particularly intended salts of various carboxylic acids, metal derivatives of phenolic compounds, mercaptides and chelates of β-dicarbonyl compounds.

More precisely, the organic lanthanide derivatives are advantageously selected from among:

(i) lanthanide salts of:

(a) aliphatic monocarboxylic acids having from 2 to 30 carbon atoms or aliphatic dicarboxylic acids having from 3 to 30 carbon atoms, which are saturated or contain one or more ethylenic double bonds and which can contain one or more substituents such as halogen atoms, hydroxyl groups, alkoxy groups having from 1 to 12 carbon atoms, mercapto groups or phenyl, phenoxy, naphthyl or cyclohexyl groups, the ring members of which are optionally substituted by one or more halogen atoms, hydroxyl groups, alkyl groups having 1 to 6 carbon atoms or alkoxy groups having 1 to 6 carbon atoms;

(b) benzoic, 1-naphthoic, 2-naphthoic, cyclopentanecarboxylic, cyclohexanecarboxylic, cyclopentenecarboxylic or cyclohexenecarboxylic acid, it being possible for the cyclic moieties of these acids to contain one or more substituents such as halogen atoms, hydroxyl groups, alkyl groups having 1 to 12 carbon atoms, alkenyl groups having 2 to 12 carbon atoms, alkoxy groups having 1 to 12 carbon atoms, phenyl, benzyl, phenoxy or cyclohexyl groups, alkoxycarbonyl groups having 2 to 24 carbon atoms or alkenoxycarbonyl groups having 4 to 24 carbon atoms;

(c) monoalkyl esters (the alkyl group having 1 to 24 carbon atoms) or monoalkenyl esters (the alkenyl group having 3 to 24 carbon atoms) of the aliphatic dicarboxylic acids indicated above; or (d) heterocyclic carboxylic acids, especially those derived from pyridine, furan, thiophene, pyrrole and pyran, which can contain one or more substituents such as halogen atoms, hydroxyl groups, alkyl groups having 1 to 12 carbon atoms, alkoxy groups having 1 to 12 carbon atoms, alkenyl groups having 2 to 12 carbon atoms, alkoxycarbonyl groups having 2 to 24 carbon atoms or alkenoxycarbonyl groups having 4 to 24 carbon atoms;

(ii) lanthanide phenates derived from phenol, 1-naphthol or 2-naphthol, the cyclic moieties of which can contain one or more substituents such as halogen atoms, alkyl or alkoxy groups having 1 to 24 carbon atoms, alkenyl groups having 2 to 24 carbon atoms or phenyl, benzyl, phenoxy or cyclohexyl groups;

(iii) lanthanide mercaptides, especially those derived from thioglycolic or thiomalic acid and from their alkyl esters (the alkyl radical having 1 to 12 carbon atoms), alkenyl esters (the alkenyl radical having 2 to 12 carbon atoms), phenyl, benzyl or cyclohexyl esters, alkanediol esters (the alkanediol having from 2 to 12 carbon atoms) or dihydroxybenzene or dihydroxycyclohexane esters, it being possible for the cyclic moieties of the said esters to be substituted by one or more alkyl or alkoxy radicals having from 1 to 6 carbon atoms; and (iv) lanthanide chelates of β-dicarbonyl compounds, especially those derived from the compounds of the general formula (I):

$$R_1-CO-CHR_2-CO-R_3 \qquad (I)$$

in which:

$R_1$ and $R_3$, which are identical or different, represent:

(1) a linear or branched chain alkyl group having 1 to 36 carbon atoms, which is optionally substituted by one or more halogen atoms, (2) a linear or branched chain alkenyl group having 3 to 36 carbon atoms, which is optionally substituted by one or more halogen atoms, (3) an aryl radical or an aryl radical whose aromatic ring bears one or more substituents such as:

(a) alkyl radicals having 1 to 6 carbon atoms, which are optionally substituted by one or more halogen atoms, (b) alkenyl radicals having 2 to 6 carbon atoms, which are optionally substituted by one or more halogen atoms, (c) the nitro group, (d) the —CHO group, (e) the —COOH group, (f) alkoxy groups having 1 to 6 carbon atoms, (g) —COOR$_4$ groups, R$_4$ being an alkyl radical having 1 to 12 carbon atoms or an alkenyl radical having 2 to 12 carbon atoms, (h) the OH group or (i) halogen atoms, (4) an aralkyl radical, the aliphatic moiety of which contains from 1 to 12 carbon atoms and the cyclic moiety of which can contain one or more of the substituents indicated above, (5) a cycloaliphatic radical containing from 5 to 12 carbon atoms, the cyclic moiety of which can contain one or more carbon-carbon double bonds and bear one or more of the substituents indicated above, or (6) a sequence of several of the radicals indicated above, it also being possible for the various aliphatic radicals defined above to contain one or more oxygen atoms —O—, sulfur atoms —S—, carbonyl groups —CO— or carboxylate groups —COO—; and $R_2$ represents a hydrogen atom.

Among the organic lanthanide derivatives which are advantageously used in the compositions according to the invention, the following are preferably selected, in particular for practical reasons or for economic reasons of availability or price:

(i) lanthanide salts of:

(1) aliphatic monocarboxylic acids having from 6 to 24 carbon atoms, which are saturated or possess an ethylenic double bond and which can contain one or more substituents such as chlorine atoms, hydroxyl groups, alkoxy groups having from 1 to 6 carbon atoms or phenyl, phenoxy or cyclohexyl groups, these cyclic moieties being optionally substituted by one or more chlorine atoms, hydroxyl groups or alkyl or alkoxy groups having 1 to 6 carbon atoms;

(2) mercaptomonocarboxylic acids having from 2 to 6 carbon atoms or mercaptodicarboxylic acids having from 3 to 6 carbon atoms;

(3) benzoic or cyclohexanecarboxylic acid, the cyclic moiety of which can contain one or more substituents such as chlorine atoms, hydroxyl groups, alkyl or alkoxy groups having 1 to 6 carbon atoms or alkoxycarbonyl groups having 2 to 12 carbon atoms;

(4) monoalkyl esters (the alkyl group having 1 to 12 carbon atoms) of aliphatic dicarboxylic acids having 4 to 24 carbon atoms, which are saturated or possess an ethylenic double bond and which can contain one or more substituents such as chlorine atoms, hydroxyl groups, mercapto groups or alkoxy groups having 1 to 6 carbon atoms; and (5) lanthanide phenates derived from phenol, the ring of which can contain one or more substituents such as chlorine atoms, alkyl or alkoxy groups having 1 to 12 carbon atoms or phenyl, benzyl, phenoxy or cyclohexyl groups.

Exemplary of such organic lanthanide derivatives which are used consistent herewith, representative are:

(i) lanthanide salts, especially the cerium, lanthanum, praseodymium and neodymium salts, of propionic, hexanoic, n-octanoic, 2-ethylhexanoic, isooctanoic, nonanoic, decanoic, lauric, stearic, oleic, ricinoleic, margaric, tetradecanoic, 12-hydroxystearic, docosanoic, docos-13-enoic (erucic), 2-chlorodecanoic, 2-octyldecanoic, 2-hydroxyhexanoic, thioglycolic, mercaptopropionic, thiomalic, 6-cyclohexylhexanoic, benzoic, phenylacetic, 2-phenylpropanoic, 2-methylbenzoic, 4-methylbenzoic, 2-phenoxybenzoic, 4-propylbenzoic, 4-methoxybenzoic, 4-tert.-butylbenzoic, salicyclic, 5-tert.butylsalicyclic, 4-hydroxy-3-methoxybenzoic, 3,4-dimethoxybenzoic, 1-naphthoic; 2-naphthoic, cyclohexanecarboxylic, nicotinic, isonicotinic and 4-methylfurane-3-carboxylic acids, monoisooctyl maleate, mono(2-ethoxyethyl) maleate, monobutyl phthalate, monobutyl thiomalate and monohexyl thiomalate;

(ii) lanthanide phenates, especially the cerium, lanthanum, praseodymium and neodymium phenates, of the following phenolic compounds: phenol, cresols, ethylphenols, xylenols, butylphenols, isopentylphenols, isooctylphenols, tert.nonylphenols, decylphenols, dodecylphenols, tert.-octylphenols, 4-cyclohexylphenol, 4-phenylphenol, ditert.-nonylphenols and methylisohexylphenols;

(iii) lanthanide chelates, especially the cerium, lanthanum, praseodymium and neodymium chelates, of the following β-diketones: heptane-2,4-dione, decane-2,4-dione, 2-ethyldec-2-ene-6,8-dione, 2-methylnon-2-ene-6,8-dione, stearoylacetone, 1-stearoyloctan-2-one, ethyl 7,9-dioxodecanoate, benzoylacetone, acetylacetone, 1-benzoyloctan-2-one, 1,4-diphenylbutane-1,3-dione, stearoylacetophEnone, palmitoylacetophenone, 1-benzoyl-4-methylpentanone, benzoyl-octacosanoylmethane, paramethoxybenzoylstearoylmethane and dibenzoylmethane; and (iv) lanthanide mercaptides, especially the cerium, lanthanum, praseodymium and neodymium mercaptides, of thioglycolic acid, isooctyl thioglycolate, octadecyl thioglycolate, benzyl thioglycolate, lauryl thioglycolate, cyclohexane-1,4-diol dithioglycolate, 4-tert.-butylcyclohexyl thioglycolate, thiomalic acid, hexyl thiomalate, 2-ethylhexyl thiomalate, dodecyl thiomalate, benzyl thiomalate, cyclohexyl thiomalate, propane-1,3-diol thiomalate, butane-1,4-diol thiomalate and hexane-1,6-diol thiomalate.

The organic lanthanide derivatives, which are not directly available, are prepared by conventional methods such as the reaction of a carboxylic acid or its anhydride, a phenolic compound, a mercaptocarboxylic acid (or one of its esters) or a β-diketone with a lanthanide oxide or hydroxide or, depending on the particular case, with a mixture of such oxides or hydroxides, in a suitable solvent medium, with heating if necessary.

By the expression "inorganic lanthanide derivative" are more particularly intended the oxides, hydroxides, salts of mineral hydracids and salts of mineral oxyacids.

More precisely, exemplary lanthanide salts of mineral hydracids are, for example, the chloride, bromide, iodide, sulfide, selenide and telluride, and lanthanide salts of mineral oxyacids are, for example, the sulfite, sulfate, sulfonate, nitrite, nitrate, phosphite, phosphate, pyrophosphate, carbonate, perchlorate, antimonate, arsenate, selenite, selenate, vanadate and tungstate.

Among the inorganic lanthanide derivatves which are advantageously used in the compositions according to the invention, the lanthanide oxides, chlorides, sulfates or nitrates are preferably selected, in particular for practical reasons or for economic reasons of availability or price.

In the lanthanide derivatives used in the compositions according to the invention, the lanthanide can be present in any of the different oxidation states which it may have; most frequently, it is present in oxidation state III or IV.

In a very preferred embodiment of the present invention, an effective amount of at least one lanthanide-based compound selected from among lanthanum(III) stearate, lanthanum(III) oxide, lanthanum(III) chloride, cerium(III) stearate, cerium(IV) oxide and cerium(III) chloride is used.

The amount of lanthanide-based compound(s) used can vary over very wide limits. More precisely, this amount is determined in such manner as to provide from $0.1 \cdot 10^{-3}$ to $100 \cdot 10^{-3}$ gram atoms of metal of the lanthanide group per 100 g of polyamide. Preferably, this amount is determined in such manner as to provide from $0.2 \cdot 10^{-3}$ to $30 \cdot 10^{-3}$ gram atoms of metal of the lanthanide group per 100 g of polyamide. Even more preferably, this amount is determined in such manner as to provide from $0.3 \cdot 10^{-3}$ to $10 \cdot 10^{-3}$ gram atoms of metal of the lanthanide group per 100 g of polyamide.

The polyamides which are to be rendered fireproof and to which the present invention relates include: polyamides obtained by the polycondensation of saturated aliphatic dicarboxylic acids having from 6 to 12 carbon atoms with saturated aliphatic bis-primary diamines having from 6 to 12 carbon atoms; polyaminoacids obtained either by the direct homopolycondensation of ω-amino-alkanoic acids containing a hydrocarbon chain having from 4 to 12 carbon atoms, or by the hydrolytic ring opening and polymerization of the lactams derived from these acids; copolyamides obtained from the starting monomers of the abovementioned polyamides, it also being possible for part of the acid component of these copolyamides to consist of terephthalic acid and/or isophthalic acid; and mixtures of polyamides of the aforesaid types.

Representative of the polyamides obtained by the polycondensation of diacids and diamines are: nylon 66 (polymer of hexamethylenediamine and adipic acid), nylon 69 (polymer of hexamethylenediamine and azelaic acid), nylon 610 (polymer of hexamethylenediamine and sebacic acid) and nylon 612 (polymer of hexamethylenediamine and dodecanedioic acid).

The following are representative of suitable polyaminoacids: nylon 4 (polymer of 4-aminobutanoic acid or γ-butylrolactam), nylon 5 (polymer of 5-aminopentanoic acid or δ-amylolactam), nylon 6 (polymer of ε-caprolactam), nylon 7 (polymer of 7-aminoheptanoic acid), nylon 8 (polymer of capryllactam), nylon 9 (polymer of 9-aminononanoic acid), nylon 10 (polymer of 10-aminodecanoic acid), nylon 11 (polymer of 11-aminoundecanoic acid) and nylon 12 (polymer of 12-aminododecanoic acid or laurolactam).

Exemplary of the copolyamides are: nylon 66/610 (copolymer of hexamethylenediamine, adipic acid and sebacic acid) and nylon 66/6 (copolymer of hexamethylenediamine, adipic acid and caprolactam).

The polyamides which preferably are rendered fireproof according to the present invention are nylon 66, nylon 610, nylon 6, nylon 66/610 and nylon 66/6.

By the expression "red phosphorus" in terms of the present invention are intended the different colored allotropic varieties of phosphorus (red, violet or black phosphorus) which are marketed under the name of red phosphorus.

The amount of red phosphorus typically ranges from 0.02 to 25% by weight, relative to the total weight of the composition; this amount preferably ranges from 0.2 to 15% by weight. In general, it is desirable to use the red phosphorus in a finely divided form, for example, in the form of particles whose average diameter does not exceed 200 μm and preferably ranges from 1 to 100 μm.

As regards the lanthanide-based compound, this can be in the form of a solid or paste. In the case where it is a solid compound, it is advantageously used in the form of particles whose average diameter does not exceed 200 μm and preferably ranges from 1 to 100 μm. When the compound used is available in the anhydrous form or in a crystalline form containing molecules of water, it is preferred to use the anhydrous compound in order to avoid any release of water during the conversion.

The compositions according to the present invention can be prepared by simply mixing the various constituents in any of the appropriate ways making it possible to obtain a homogeneous composition. Preferably, the various constituents are mixed in the form of powder or granules, firstly by carrying out a cold premixing operation in a conventional mixer and then by homogenizing the entire mass by a hot malaxating operation in a single-screw or multiscrew extruder. Rods are obtained upon completion of this treatment; they are cooled with water and then chopped into granules, which can then optionally be dried. The compositions according to the invention can also be prepared by making a masterbatch in the form of granules based on part of the polyamide to be rendered fireproof, red phosphorus and the lanthanide-based compound, which will then be mixed, before processing, with granules of the remainder of the polyamide to be rendered fireproof.

These compositions have been defined above by their essential constituents. It is apparent that the scope of the invention would not be exceeded if these compositions were modified in the manner indicated below. Thus, as regards the red phosphorus, for example, it is possible either to use the red phosphorus as such or, preferably to use particles of red phosphorus coated with a polymer film. Of these polymers, the following are particularly suitable: epoxy resins (cf. French Pat. No. 2,314,221), polymers having unsaturated bonds of the maleic, fumaric or allylic type (cf. French Pat. No. 2,314,219), saturated polyesters with a melting point of from 50° to 90° C. and a molecular weight of less than 10,000 (cf. French Pat. No. 2,373,575), thermoplastic phenol/formaldehyde polycondensates of the novolac type (cf. French Pat. No. 2,344,615) and thermoplastic phenol/isobutyraldehyde polycondensates (cf. European patent application No. 82/106,329.4, published under No. 0,071,788); the use of thermoplastic phenol/formaldehyde polycondensates constitutes a particularly preferred embodiment of the present invention. The amount of polymer used to coat the particles of phosphorus, if appropriate, can vary over wide limits. In general, this amount represents 5 to 50% of the total weight of the mixture of red phosphorus/coating polymer. It should be noted that there is no disadvantage in using larger amounts of coating polymer ranging up to 90% of the total weight of the mixture of red phosphorus/coating polymer.

Furthermore, when they are intended, for example, for the production of shaped articles, the compositions according to the invention can contain various additives: thus, they can contain reinforcing or gelling fillers, such as glass fibers or asbestos fibers, glass microspheres, kaolin, talc, silica, micas, bentonites, bentones, or mixtures of these species. Of the above-mentioned fillers, glass fibers are the most commonly used; these fibers generally have an average diameter of from 1 to 15 μm and a length of from 2 to 8 mm. To obtain articles possessing optimum mechanical properties, it is advantageous to use fibers which have been sized, for example, by means of epoxy resins, polyester resins, polyurethane resins or vinyl resins, these resins generally being used in association with coupling agents of the aminosilane type. The proportion of fillers can vary from, for example, 15% to 60% by weight, relative to the total weight of the composition.

It is also envisaged to use other additives, such as lubricants, stabilizers, impact strengtheners, piqments or dyestuffs, antistatic agents and crystallizing agents; these last additives and their use are widely described in the literature.

The compositions according to the invention can be converted to finished or semi-finished articles by the usual techniques of injection molding or extrusion. As above-indicated, one of the advantages of these compositions is the fact that this conversion, which is typically carried out at a temperature on the order of 200° to 320° C., is accompanied by only a very slight emission of hydrogen phosphide, this emission generally being less than 0.3 ppm and even less than 0.1 ppm; the limit of 0.3 ppm represents the maximum concentration which is not to be exceeded (cf. Sax, *Dangerous Properties of Industrial Materials,* 3rd Edition, pages 1019 and 1020). For appropriate phosphorus contents, the articles obtained are fire-resistant and, when exposed to a flame, do not give rise to the formation of drops of molten and possibly flaming material. They have an excellent arc tracking resistance, which can be greater than that determined with cadmium oxide. It is also found that the fireproof articles obtained also have an excellent resilience and a good thermal aging stability in air; the performance characteristics determined in this respect are generally superior to those obtained using cadmium oxide. From the point of view of controlling and limiting the change in the molecular characteristics of the fireproof polyamide during conversion, it is observed that the lanthanide-based compounds have the same efficacy as cadmium oxide. Thus, the lanthanide-based compounds not only have the same advantages as cadmium oxide in terms of inhibiting the release of phosphine and controlling and limiting the change in the molecular characteristics of the fireproof polyamide, but are also capable, in certain cases (arc tracking resistance, resilience, aging stability), of producing better performance characteristics. In sum, in comparison with the results obtained using cadmium oxide, the lanthanide-based compounds provide a better compromise of properties, which is a totally unexpected result.

The fireproof compositions according to the present invention are particularly suitable for the fabrication of shaped articles which can be used in electricity fields (for example, electrical and electronics, household equipment, radio and car industries). The characteristics of these compositions also make it possible to manufacture articles by extrusion and film formation.

In order to further illustrate the present invention and the advantages thereof, the following specific examples are given, it being understood that same are intended only as illustrative and in nowise limitative.

Prior to setting forth said specific examples, the effect which the various constituents (other than the polyamide) of a control composition comprising:

(i) nylon 66,
(ii) red phosphorus coated with a phenol/formaldehyde polycondensate,
(iii) glass fibers and
(iv) cadmium oxide can have on the change in the viscosity index and the apparent viscosity of the polyamide will be demonstrated with reference 15 to the experiments A to G which immediately follow.

EXPERIMENTS A to G

1. Description of the starting materials:

(i) Nylon 66 (polymer of hexamethylenediamine and adipic acid): this was a polymer having a viscosity index of 133 ml/g (determined according to ISO Standard Specification R 307, 1977 edition, on the fraction soluble in 90% formic acid);

(ii) coated red phosphorus: this was a composition (designated hereinafter by the expression "phosphorus masterbatch") containing 60% by weight of red phosphorus having an average particle size of 20 to 30 $\mu$m, which was coated with 40% by weight of a phenol/formaldehyde polycondensate having a melting point of 80° C. and a molecular weight of 800 (a resin marketed by Rhône-Poulenc under the trademark Phénorez PB 71 DA). Such coating was carried out as follows: (a) 60 parts by weight of red phosphorus were intimately mixed, at 25° C., with 40 parts by weight of Phénorez resin by agitation on rollers for 12 hours; (b) the mixture was then poured to a thickness of 1 cm onto plates coated with aluminum foil; (c) the entire assembly was placed in an oven at 130° C. for 3 hours; and (d) the plates obtained were broken into fragments;

(iii) glass fibers: these were short fibers having an average diameter of 10 $\mu$m and a length of from 3 to 6 mm, containing a size for polyamide and marketed by Owens Corning Fiberglas under the trademark R 17 BX 1; and (iv) cadmium oxide: this was in the form of particles whose average diameter did not exceed 100 $\mu$m.

2. Details of experiments:

Experiment A: the nylon 66 was extruded under the operating conditions described below;

Experiment B: a composition was prepared from: 69 parts by weight of nylon 66+31 parts by weight of glass fibers +0.27 part by weight of lubricating additive (wax-ester derived from behenic acid and/or montanic acid);

Experiment C: a composition was prepared from: 69 parts by weight of nylon 66+31 parts by weight of glass fibers +0.27 part by weight of wax-ester +0.345 part by weight of cadmium oxide ($3.9.10^{-3}$ gram atoms of cadmium/100 g of nylon 66);

Experiment D: a composition was prepared from: 95 parts by weight of the composition of Experiment B and 5 parts by weight of Phénorez resin; the final composition contained: 65.37 parts by weight of nylon 66+29.37 parts by weight of glass fibers +0.26 part by weight of wax-ester +5 parts by weight of Phénorez resin;

Experiment E: a composition was prepared from: 95 parts by weight of the composition of Experiment B, 5 parts by weight of Phénorez resin and 0.327 part by weight of cadmium oxide; the final composition contained: 65.37 parts by weight of nylon 66+29.37 parts by weight of glass fibers +0.26 part by weight of wax-ester +5 parts by weight of Phénorez resin +0.327 part by weight of cadmium oxide ($3.9.10^{-3}$ gram atoms of cadmium/100 g of nylon 66);

Experiment F: a composition was prepared from: 88.33 parts by weight of the composition of Experiment B and 11.67 parts by weight of phosphorus masterbatch; the final composition contained: 60.78 parts by weight of nylon 66+27.3 parts by weight of glass fibers +0.24 part by weight of wax-ester +11.67 parts by weight of phosphorus masterbatch (red phosphorus: 7 parts by weight; Phénorez resin: 4.67 parts by weight) +0.304 part by weight of cadmium oxide ($3.9.10^{-3}$ gram atoms of cadmium/100 g of nylon 66).

3. General procedure and controls carried out:

The compositions of Experiments B to G were prepared in the following manner:

A premixture of the various constituents was first prepared dry, at 25° C., by passage through a mixer of trademark Moritz.

This premixture was then malaxated in the molten state in a vented extruder of trademark Prodex, containing a screw with a diameter D equal to 65 mm and a length equal to 24 D; the screw was a cylindro-conical screw having a profile suitable for processing polyamides; the extruder was also equipped with a die possessing two orifices of diameter 5 mm; the extrusion conditions were as follows:

| (a) | temperature: | 270°–330° C. |
|---|---|---|
| (b) | vacuum: | $944.10^2$ Pa |
| (c) | screw speed: | 70 rpm |

For each experiment, the pressure of the material at the end of the screw and the throughput of material were noted. In Experiment A, the procedure consisted of carrying out only one pass through the Prodex extruder. The product collected in rod form was cooled by passage through a bath of cold water and was then granulated and dried.

The following values were determined on the molding powder thus obtained: the water content, the viscosity index of the nylon 66 and the apparent viscosity at 290° C., under a velocity gradient $\gamma=240$ s$^{-1}$, after a residence time of 5 minutes in the rheometer.

To determine the viscosity index, the dissolution time in formic acid was adjusted to give complete dissolution. Thus, in the case of compositions comprising red phosphorus and not containing cadmium oxide (which, as will be seen, makes it possible to limit the change in the molecular characteristics of the polyamide during extrusion), it was necessary to first increase the dissolution time, which was usually 2 hours at 25° C., to 3 hours and, secondly, to heat to 40° C.

The apparent viscosity of the molding powder in the molten state was determined using an Instrom 3211 rheometer equipped with a die having a length of 60 mm and a diameter of 1 mm. Before the measurements were carried out, the granules of the molding powder were dried for 3 hours at 150° C. in vacuo. The temperature selected for the measurements (290° C.) corresponded to the average temperature representing the extrusion and injection molding conditions. The measurements were carried out after a residence time of 5 minutes in the rheometer (after the charging of the granules); this duration corresponded to the average duration representing the conditions of injection molding on the press. Determination of the apparent viscosity thus made it possible to assess the stability of the molding powder in the molten phase.

The viscosity index of the nylon 66 was also determined, but this time on a molded test-piece. These test-pieces were prepared using a screw press of trademark DK, type 60. In this press, the granules of the molding powder were melted at a temperature of 280° C., the mold being maintained at a temperature of 80° C.; the injection molding pressure was 80 MPa; the duration of the injection molding cycle was 17 sec.

4. Results of Experiments A to G:

The results obtained are reported in Table I which follows:

tributed to the slight post-condensation normally undergone by the polyamide during extrusion in vacuo. Experiment G demonstrated that the cadmium oxide made it possible to control and limit this large change effectively, both during the extrusion (cf. the value of the viscosity index determined on the molding powder) and during an injection molding operation (cf. the value of the viscosity index determined on a molded test-piece). On extrusion, the composition of Experiment F was characterized, compared with the composition of Experiment G, by a more delicate lift-off of the rods, by non-uniformities of throughput, by a greater pressure of material at the end of the screw and by a more than 30% lower throughput of material.

EXAMPLES 1 TO 3 AND COMPARATIVE EXPERIMENT H

1. Details of examples and experiment:

The following experiments make it possible to determine the behavior of compositions based on polyamide and glass fibers and rendered fireproof by means of coated red phosphorus, in which the adjuvant which makes it possible to inhibit the release of phosphine during conversion (extrusion and injection molding) and also to control and limit the change in the molecular characteristics of the polyamide during conversion was:

(1) cadmium oxide (CdO) (Experiment H);
(2) cerium(III) chloride (CeCl$_3$) (Example 1);
(3) cerium(III) stearate [Ce(C$_{17}$H$_{35}$COO)$_3$] (Example 2);
(4) lanthanum(III) stearate [La(C$_{17}$H$_{35}$COO)$_3$] (Example 3).

These various adjuvants were introduced into the compositions in quantities such that they provided 2.3.10$^{-3}$ gram atoms of metal (Cd, Ce or La) per 100 g of polyamide.

More precisely, the compositions obtained from the following constituents were prepared:

Experiment H: 63.73 parts by weight of nylon 66+25 parts by weight of glass fibers +0.259 part by weight of wax-ester +10.82 parts by weight of phosphorus masterbatch (red phosphorus: 6.49 parts by weight; Phénorez resin: 4.33 parts by weight) +0.191 part by weight of cadmium oxide;

Example 1: 63.57 parts by weight of nylon 66+25 parts by weight of glass fibers +0.237 part by weight of wax-ester +10.82 parts by weight of phosphorus masterbatch +0.373 part by weight of cerium(III) chloride;

TABLE I

| | EXTRUSION | | MOLDING POWDER | | | |
|---|---|---|---|---|---|---|
| EXPERIMENT | Pressure of material at the end of the screw (MPa) | Throughput of material (kg/hour) | Water content (% by weight) | Viscosity index (ml/g) | Apparent viscosity (poises) | Viscosity index on molded test-pieces (ml/g) |
| A | 1 | 27.3 | <0.1 | 142 | | |
| B | 5 | 29.1 | <0.1 | 142 | | |
| C | 5 | 30.3 | <0.1 | 134 | | |
| D | 5 | 30.3 | <0.1 | 142 | | |
| E | 5 | 33.0 | <0.1 | 134 | | |
| F | 6 | 33.0 | <0.1 | 163 | 7 000 | 202 |
| G | 5 | 51.0 | <0.1 | 143 | 2 500 | 152 |

Experiments A to E evidence that, of all the constituents of the composition of Experiment F (present in the same weight ratio relative to the polyamide), only the red phosphorus results in a large increase in the viscosity index of the nylon 66 during the extrusion operation. This was well beyond the increase which could be at- Example 2: 62.74 parts by weight of nylon 66+25 parts by weight of glass fibers +10.82 parts by weight of phosphorus masterbatch +1.440 parts by weight of cerium(III) stearate;

Example 3: 62.74 parts by weight of nylon 66+25 parts by weight of glass fibers +10.82 parts by weight of phosphorus masterbatch +1.440 parts by weight of lanthanum(III) stearate.

In this experiment and these examples, the nylon 66, the glass fibers, the wax-ester and the phosphorus masterbatch were identical to the constituents used in above Experiments A to G.

2. General procedure and controls carried out:

The compositions were prepared in the manner indicated above in paragraph 3 of the description of Experiments A to G. It should be noted that the operating conditions of the extrusion operation in this case were as follows:

| (a) | temperature: | 270° C.–335° C. |
|---|---|---|
| (b) | vacuum: | $944.10^2$ Pa |
| (c) | screw speed: | 60 rpm |

The following values were determined on the molding powder obtained: the water content, the viscosity index of the nylon 66 and the apparent viscosity at 290° C., under a velocity gradient $\gamma = 240$ s$^{-1}$, after a residence time of 5 minutes in the rheometer.

The following values were determined on molded test-pieces (molded under the conditions indicated above in paragraph 3 at the end of the description of Experiments A to G):

(i) the resilience, consisting of the Charpy impact strength: this was measured at 23° C. on smooth bar-type test-pieces of 60×10×4 mm, conditioned in a manner known per se at EHO or at EH 50, according to French Standard Specification T 51 035; the results are expressed in kj/m$^2$;

(ii) the combustibility according to the UL 94 vertical test of "Underwriters Laboratories", as described in document 9750-1 of the Bureau des Normalisations des Matières Plastiques, in order to measure the degree of fire resistance; dimensions of the test-pieces: 127×12.7×1.6 mm and 127×12.7×0.8 mm;

(iii) the arc tracking resistance index (abbreviated to TRI) according to French Standard Specification C 26 220; the measurements were carried out on test-pieces of dimensions 50×50×3 mm;

(iv) the viscosity index of the nylon 66.

Furthermore, air samples were taken by means of a CH 31 101 Draeger tube in order to detect the possible presence of hydrogen phosphide:

(a) during extrusion: at the outlet of the vacuum pump, (b) during injection molding: above the injection nozzle of the DK 60 press.

3. Results of Examples 1 to 3 and Experiment H:

The results obtained are reported in Table II which follows:

TABLE II

| EXAMPLE OR EXPERIMENT | EXTRUSION | | | MOLDING POWDER | | | |
|---|---|---|---|---|---|---|---|
| | Pressure of material at the end of the screw (MPa) | Throughput of material (kg/hour) | Release of PH$_3$ (ppm) | Calculated phosphorus content (%) | Water content (%) | Viscosity index (ml/g) | Apparent viscosity (poises) |
| H | 5 | 30 | <0.1 | 6.49 | 0.06 | 141 | 2 500 |
| 1 | 5 | 31 | <0.1 | 6.49 | 0.06 | 142 | 3 000 |
| 2 | 5 | 28 | <0.1 | 6.49 | 0.07 | 135 | 2 000 |
| 3 | 5 | 30 | <0.1 | 6.49 | 0.07 | 132 | 1 900 |

| EXAMPLE OR EXPERIMENT | CHARPY IMPACT STRENGTH OF SMOOTH TEST-PIECES | | UL 94 Classification, thickness 1.6 mm | TRI | | Viscosity index on molded test-pieces (ml/g) | Release of PH$_3$ during injection molding (ppm) |
|---|---|---|---|---|---|---|---|
| | EHO kj/m$^2$ | EH 50 kj/m$^2$ | | Voltage (V) | Erosion (mm) | | |
| H | 23 | 26 | V-O | 375 | 0.4–0.5 | 149 | <0.1 |
| 1 | 31 | 29 | V-O | 350 | 0.4 | 140 | <0.1 |
| 2 | 29 | 29 | V-O | 400 | 0.3 | 120 | <0.1 |
| 3 | 26 | 28 | V-O | 450 | 0.5 | 120 | <0.1 |

It will be seen from Table II that the compounds based on lanthanide, cerium(III) chloride and cerium-(III) and lanthanum(III) stearates have the same advantages as cadmium oxide in terms of inhibiting the release of phosphine and controlling and limiting the change in the molecular characteristics of nylon 66 rendered fireproof with red phosphorus. The molding powder containing cerium(III) chloride appeared to be particularly stable to molding. As regards resilience and arc tracking resistance, it is also apparent that the lanthanide-based compounds were capable of producing substantially superior results.

EXAMPLES 4 TO 13 AND COMPARATIVE EXPERIMENTS I AND J

1. Details of examples and experiments:

The following experiments make it possible to determine the behavior of polyamide-based compositions not containing glass fibers and rendered fireproof by means of coated red phosphorus, in which the following were used:

(1) no metal adjuvant (Experiment I);

(2) cadmium oxide (Experiment J);

(3) cerium(IV) oxide (CeO$_2$) used in different proportions (Examples 4, 5 and 6);

(4) lanthanum(III) oxide (La$_2$O$_3$) used in different proportions (Examples 7 and 8);

(5) cerium(III) stearate used in different proportions (Examples 9, 10 and 11);

(6) lanthanum(III) stearate used in different proportions (Examples 12 and 13).

More precisely, the compositions obtained from the constituents reported in Table III below were prepared:

TABLE III

| Example/Experiment | Nylon 66 | Phosphorus masterbatch | Total adjuvant Nature | Parts by weight | Gram atoms of metal/100 g of nylon |
|---|---|---|---|---|---|
| I | 89 | 11 | — | — | — |
| J | 89 | 11 | CdO | 0.300 | $2.6 \cdot 10^{-3}$ |
| 4 | 89 | 11 | $CeO_2$ | 0.402 | $2.6 \cdot 10^{-3}$ |
| 5 | 89 | 11 | $CeO_2$ | 0.613 | $4.0 \cdot 10^{-3}$ |
| 6 | 89 | 11 | $CeO_2$ | 1.226 | $8.0 \cdot 10^{-3}$ |
| 7 | 89 | 11 | $La_2O_3$ | 0.381 | $2.6 \cdot 10^{-3}$ |
| 8 | 89 | 11 | $La_2O_3$ | 0.613 | $4.2 \cdot 10^{-3}$ |
| 9 | 89 | 11 | Ce stearate | 0.386 | $0.43 \cdot 10^{-3}$ |
| 10 | 89 | 11 | Ce stearate | 0.588 | $0.67 \cdot 10^{-3}$ |
| 11 | 89 | 11 | Ce stearate | 1.159 | $1.3 \cdot 10^{-3}$ |
| 12 | 89 | 11 | La stearate | 0.386 | $0.43 \cdot 10^{-3}$ |
| 13 | 89 | 11 | La stearate | 1.159 | $1.3 \cdot 10^{-3}$ |

In these experiments and examples, the nylon 66 and the phosphorus masterbatch were identical to the constituents used in Experiments A to G.

2. General procedure and controls carried out:

The compositions were prepared in the manner indicated above in paragraph 3 of the description of Experiments A to G. It should be noted that the operating conditions of the extrusion operation in this case were as follows:

| (a) | temperature: | 270° C.–330° C. |
|---|---|---|
| (b) | vacuum: | $931 \cdot 10^2$ Pa |
| (c) | screw speed: | 70 rpm |

As regards the controls carried out, some of the various physico-mechanical characteristics mentioned above in paragraph 2 of the description of Examples 1 to 3 were determined. It should be noted that, to produce the molded test-pieces, the conditions indicated in paragraph 3 at the end of the description of Experiments A to G were repeated, except for the injection pressure, which was lowered to 70 MPa, and the duration of the injection molding cycle, which was adjusted to 22 sec.

3. Results of Examples 4 to 13 and Experiments I and J:

The results obtained are reported in Table IV which follows:

EXAMPLES 14 AND COMPARATIVE EXPERIMENT K

The following experiments make it possible to determine the behavior, especially from the point of view of aging stability, of compositions based on polyamide and glass fibers and rendered fireproof by means of coated red phosphorus, in which the following were used:

(1) cadmium oxide (Experiment K);
(2) cerium(III) stearate (Example 14).

More precisely, the compositions obtained from the following constituents were prepared:

Experiment K: 64 parts by weight of nylon 66+25 parts by weight of glass fibers +0.16 part by weight of wax-ester +11 parts by weight of phosphorus masterbatch (red phosphorus: 6.6 parts by weight) +0.300 part by weight of cadmium oxide ($3.6 \cdot 10^{-3}$ gram atoms of cadmium/100 g of nylon 66;

Example 14: 64 parts by weight of nylon 66+25 parts by weight of glass fibers +11 parts by weight of phosphorus masterbatch +0.423 part by weight of cerium-(III) stearate ($0.67 \cdot 10^{-3}$ gram atom of cerium/100 g of nylon 66).

The nylon 66, the glass fibers, the wax-ester and the phosphorus masterbatch were identical to the constituents used in Experiments A to G. The conditions under which this experiment and this example were carried out are those described above in paragraph 3 of the description of Experiments A to G; it should be noted that the screw speed for carrying out the extrusion operation was set at 60 rpm in this case.

As regards the controls carried out, some of the various physico-mechanical characteristics mentioned above in paragraph 2 of the description of Examples 1 to 3 were determined. The Charpy impact strength was determined on test-pieces which in certain cases were conditioned at EHO and in other cases were placed in air for 7 days at 125° C. The results obtained are reported in Table V which follows. It will be appreciated that a composition according to the present invention had a better thermal aging stability than a composition containing cadmium oxide: with cerium stearate, a small decrease of 3% in the impact strength of smooth test-pieces was determined after 7 days at 125° C., whereas this decrease was 14% with cadmium oxide.

TABLE IV

| EXAMPLE OR EXPERIMENT | EXTRUSION Throughput of material (kg/hour) | EXTRUSION Release of $PH_3$ (ppm) | MOLDING POWDER Calculated phosphorus content (% by weight) | MOLDING POWDER Water content (% by weight) | MOLDING POWDER Viscosity index (ml/g) | MOLDING POWDER Apparent viscosity (in poises) | UL 94 Classification, thickness 1.6 mm | Viscosity index on molded test-pieces (ml/g) | Release of $PH_3$ during injection molding (ppm) |
|---|---|---|---|---|---|---|---|---|---|
| I | 20 | <0.3 | 6.60 | 0.19 | 151 | 5 000 | V-O | 162 | <0.3 |
| J | 26 | 0 | 6.58 | 0.09 | 141 | 1 500 | V-O | 148 | <0.1 |
| 4 | 38 | 0 | 6.57 | 0.09 | 145 | 4 500 | V-O | 166 | <0.1 |
| 5 | 39 | 0 | 6.55 | 0.09 | 141 | 3 000 | V-O | 155 | <0.1 |
| 6 | 37 | 0 | 6.52 | 0.10 | 142 | 2 300 | V-O | 154 | <0.1 |
| 7 | 38 | 0 | 6.57 | 0.08 | 145 | 4 200 | V-O | 157 | <0.1 |
| 8 | 39 | 0 | 6.55 | 0.08 | 139 | 3 000 | V-O | 154 | <0.1 |
| 9 | 36 | 0 | 6.57 | 0.06 | 134 | 1 100 | V-O | 134 | <0.1 |
| 10 | 40 | 0 | 6.56 | 0.05 | 137 | 960 | V-O | 135 | 0 |
| 11 | 37 | 0 | 6.52 | 0.08 | 132 | 560 | V-O | 123 | <0.1 |
| 12 | 36 | <0.1 | 6.57 | 0.08 | 137 | 1 100 | V-O | 137 | 0 |
| 13 | 38 | 0 | 6.52 | 0.08 | 135 | 500 | V-O | 125 | 0 |

TABLE V

MOLDING POWDER

TABLE V-continued

| EXAMPLE OR EXPERIMENT | EXTRUSION | | Calculated phosphorus content (% by weight) | Water content (% by weight) | Viscosity index (ml/g) |
|---|---|---|---|---|---|
| | Throughput of material (kg/hour) | Release of PH₃ (ppm) | | | |
| K | 30 | <0.1 | 6.57 | 0.10 | 145 |
| 14 | 28 | <0.1 | 6.57 | 0.13 | 139 |

| EXAMPLE OR EXPERIMENT | Charpy impact strength of smooth test-pieces | | UL 94 classification, thickness 1.6 mm | Viscosity index on molded test-pieces (ml/g) | Release of PH₃ during injection molding (ppm) | APPARENT VISCOSITY (IN POISES) |
|---|---|---|---|---|---|---|
| | EHO kj/m² | 7 days at 125° C. kj/m² | | | | |
| K | 20.1 | 17.2 | V-O | 140 | <0.1 | 2 700 |
| 14 | 25.9 | 25.1 | V-O | 136 | <0.1 | 2.300 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A composition of matter comprising (i) a polyamide, (ii) a fireproofing amount of red phosphorus, and (iii) an effective amount of at least one lanthanide compound.

2. The composition of matter as defined by claim 1, said at least one lanthanide or yttrium compound (iii) comprising an organic or inorganic derivative of cerium, lanthanum, praseodymium, neodymium, promethium, samarium, europium, gadolinium, terbium, dysprosium, holmium, erbium, ytterbium, thulium, lutetium and yttrium; or a mixture of organic and/or inorganic derivatives of a plurality of said lanthanides.

3. The composition of matter as defined by claim 2, said lanthanide comprising cerium, lanthanum, praseodymium or neodymium.

4. The composition of matter as defined by claim 2, said lanthanide comprising a mixture of derivatives of cerium and at least one of said lanthanides other than cerium; a mixture of derivatives of lanthanum and at least one of praseodymium, neodymium, promethium, samarium, europium, gadolinium, terbium, dysposium, holmium, erbium, ytterbium, thulium, lutetium and yttrium; a mixture of derivatives of praseodymium and at least one of neodymium, promethium, samarium, europium, gadolinium, terbium, dysprosium, holmium, erbium, ytterbium, thulium, lutetium and yttrium; or a mixture of derivatives of neodymium and at least one of promethium, samarium, europium, gadolinium, terbium, dysprosium, holmium, erbium, ytterbium, thulium, lutetium and yttrium.

5. The composition of matter as defined by claim 4, said cerium and/or lanthanum and/or praseodymium and/or neodymium comprising at least 40 mol % of the total amount of lanthanides.

6. The composition of matter as defined by claim 2, said at least one lanthanide or yttrium compound comprising:

(1) a lanthanide or yttrium salt of:
   (a) aliphatic monocarboxylic acids having from 2 to 30 carbon atoms or aliphatic dicarboxylic acids having from 3 to 30 carbon atoms, which are saturated or contain one or more ethylenic double bonds and which can be substituted by one or more halogen atoms, hydroxyl groups, alkoxy groups having from 1 to 12 carbon atoms, mercapto groups, or phenyl, phenoxy, naphthyl or cyclohexyl groups, the ring members of which are optionally substituted by one or more halogen atoms, hydroxyl groups, alkyl groups having 1 to 6 carbon atoms or alkoxy groups having 1 to 6 carbon atoms;
   (b) benzoic, 1-naphthoic, 2-naphthoic, cyclopentanecarboxylic, cyclohexanecarboxylic, cyclopentenecarboxylic or cyclohexenecarboxylic acid, the cyclic moieties of which optionally being substituted by one or more halogen atoms, hydroxyl groups, alkyl groups having 1 to 12 carbon atoms, alkenyl groups having 2 to 12 carbon atoms, alkoxy groups having 1 to 12 carbon atoms, phenyl, benzyl, phenoxy or cyclohexyl groups, alkoxycarbonyl groups having 2 to 24 carbon atoms or alkenoxycarbonyl groups having 4 to 24 carbon atoms;
   (c) monoalkyl esters, the alkyl moiety of which having 1 to 24 carbon atoms, or monoalkenyl esters, the alkenyl moiety of which having 3 to 24 carbon atoms, of the above aliphatic dicarboxylic acids, or
   (d) heterocyclic carboxylic acids comprising a pyridine, furan, thiophene, pyrrole or pyran nucleus, optionally substituted by one or more halogen atoms, hydroxyl groups, alkyl groups having 1 to 12 carbon atoms, alkoxy groups having 1 to 12 carbon atoms, alkenyl groups having 2 to 12 carbon atoms, alkoxycarbonyl groups having 2 to 24 carbon atoms or alkenoxycarbonyl groups having 4 to 24 carbon atoms;

(2) a lanthanide or yttrium phenate of phenol, 1-naphthol or 2-naphthol, the cyclic moieties of which optionally substituted by one or more halogen atoms, alkyl or alkoxy groups having 1 to 24 carbon atoms, alkenyl groups having 2 to 24 carbon atoms, or phenyl, benzyl, phenoxy or cyclohexyl groups;

(3) a lanthanide or yttrium mercaptide of thioglycolic or thiomalic acid, the alkyl esters thereof, the alkyl radical of which having 1 to 12 carbon atoms, the alkenyl esters thereof, the alkenyl radical of which having 2 to 12 carbon atoms, the phenyl, benzyl or cyclohexyl esters thereof, the alkanediol esters thereof, the alkanediol having from 2 to 12 carbon atoms, or the dihydroxybenzene or dihydroxycyclohexane esters thereof, the cyclic moieties of said esters optionally substituted by one or more alkyl or alkoxy radicals having from 1 to 6 carbon atoms; or (4) a lanthanide or yttrium chelate of a β-dicarbonyl compound of the general formula (I):

$$R_1-CO-CHR_2-CO-R_3 \qquad (I)$$

in which:

$R_1$ and $R_3$, which are identical or different, represent:
  (a) a linear or branched chain alkyl group having 1 to 36 carbon atoms, optionally substituted by one or more halogen atoms,
  (b) a linear or branched chain alkenyl group having 3 to 36 carbon atoms, optionally substituted by one or more halogen atoms,
  (c) an aryl radical or an aryl radical, the aromatic ring of which is substituted by one or more alkyl radicals having 1 to 6 carbon atoms, optionally substituted by one or more halogen atoms, alkenyl radicals having 2 to 6 carbon atoms, optionally substituted by one or more halogen atoms, nitro groups, —CHO groups, —COOH groups, alkoxy groups having 1 to 6 carbon atoms, —COOR$_4$ groups, R$_4$ being an alkyl radical having 1 to 12 carbon atoms or an alkenyl radical having 2 to 12 carbon atoms, OH groups or halogen atoms,
  (d) an aralkyl radical, the aliphatic moiety of which containing from 1 to 12 carbon atoms and the cyclic moiety of which is optionally substituted by one or more of the above substituents,
  (e) a cycloaliphatic radical containing from 5 to 12 carbon atoms, the cyclic moiety which optionally containing one or more carbon-carbon double bonds and optionally substituted by one or more of the above substituents, or
  (f) a sequence of a plurality of the above radicals, with the proviso that said aliphatic radicals defined above can optionally contain one or more oxygen atoms —O—, sulfur atoms —S—, carbonyl groups —CO— or carboxylate groups —COO—; and $R_2$ represents a hydrogen atom.

7. The composition of matter as defined by claim 6, said at least one lanthanide or yttrium compound comprising:
(i) a lanthanide or yttrium salt of:
  (a) aliphatic monocarboxylic acids having from 6 to 24 carbon atoms, which are saturated or ethylenically unsaturated, optionally substituted by one or more chlorine atoms, hydroxyl groups, alkoxy groups having from 1 to 6 carbon atoms or phenyl, phenoxy or cyclohexyl groups, the cyclic moieties of which optionally substituted by one or more chlorine atoms, hydroxyl groups or alkyl or alkoxy groups having 1 to 6 carbon atoms;
  (b) mercaptomonocarboxylic acids having from 2 to 6 carbon atoms or mercaptodicarboxylic acids having from 3 to 6 carbon atoms;
  (c) benzoic or cyclohexanecarboxylic acid, the cyclic moiety of which optionally substituted by one or more chlorine atoms, hydroxyl groups, alkyl or alkoxy groups having 1 to 6 carbon atoms or alkoxycarbonyl groups having 2 to 12 carbon atoms; or
  (d) monoalkyl esters, the alkyl moiety of which having 1 to 12 carbon atoms, of aliphatic dicarboxylic acids having 4 to 24 carbon atoms, which are saturated or ethylenically unsaturated, optionally substituted by one or more chlorine atoms, hydroxyl groups, mercapto groups or alkoxy groups having 1 to 6 carbon atoms; or
(ii) a lanthanide or yttrium phenate of phenol, the ring member of which optionally substituted by one or more chlorine atoms, alkyl or alkoxy groups having 1 to 12 carbon atoms, or phenyl, benzyl, phenoxy or cyclohexyl groups.

8. The composition of matter as defined by claim 2, said at least one lanthanide or yttrium compound comprising a lanthanide or yttrium oxide, hydroxide, salt of a mineral hydracid and/or salt of a mineral oxyacid.

9. The composition of matter as defined by claim 8, said at least one lanthanide or yttrium compound comprising a chloride, bromide, iodide, sulphide, selenide, telluride, sulfite, sulfate, sulfonate, nitrite, nitrate, phosphite, phosphate, pyrophosphate, carbonate, perchlorate, antimonate, arsenate, selenite, selenate, vanadate or tungstate salt.

10. The composition of matter as defined by claim 1, said at least one lanthanide or yttrium compound comprising lanthanum(III) stearate, lanthanum(III) oxide, lanthanum(III) chloride, cerium(III) stearate, cerium(IV) oxide or cerium(III) chloride.

11. The composition of matter as defined by claim 1, comprising from $0.1 \cdot 10^{-3}$ to $100 \cdot 10^{-3}$ gram atoms of lanthanide or yttrium metal per 100 g of polyamide.

12. The composition of matter as defined by claim 11, said polyamide comprising a polyamide obtained by polycondensation of saturated aliphatic dicarboxylic acids having from 6 to 12 carbon atoms with saturated aliphatic bis-primary diamines having from 6 to 12 carbon atoms; a polyaminoacid obtained by direct homopolycondensation of $\omega$-aminoalkanoic acids having from 4 to 12 carbon atoms, or by hydrolytic ring opening and polymerization of the lactams of such acids; a copolyamide of the above comonomers, a fraction of the acid component of such copolyamides optionally comprising terephthalic acid and/or isophthalic acid; or mixture thereof.

13. The composition of matter as defined by claim 1, comprising from 0.02 to 25% by weight of said red phosphorus relative to the total weight of the composition.

14. The composition of matter as defined by claim 13, said red phosphorus comprising particles coated with a polymer film.

15. The composition of matter as defined by claim 14, said coating polymer comprising epoxy resin, unsaturated maleic, fumaric or allylic polymer, saturated polyester, thermoplastic phenol/formaldehyde polycondensate or phenol/isobutyraldehyde polycondensate.

16. The composition of matter as defined by claim 1, comprising from 15 to 60% by weight of glass fiber filler material, relative to the total weight of the composition.

17. A shaped article comprising the composition of matter as defined by claim 1.

* * * * *